（12） United States Patent
Campagna et al.

(10) Patent No.: US 6,167,872 B1
(45) Date of Patent: Jan. 2, 2001

(54) CLEANER FOR COMBUSTION SYSTEMS AND CATALYTIC CONVERTERS

(76) Inventors: Marc Jean Campagna, 1470 Chemin Dayers Cliff, P.O. Box 175, Katevale, Quebec (CA), U0B 1W0; Richard Herbert Colt, 1785, chemin, Ayer's Cliff, Quebec (CA), J0B 1C0

( * ) Notice: Under 35 U.S.C. 154(b), the term of this patent shall be extended for 0 days.

(21) Appl. No.: 09/372,056

(22) Filed: Aug. 11, 1999

Related U.S. Application Data
(60) Provisional application No. 60/105,995, filed on Oct. 28, 1998.

(30) Foreign Application Priority Data

Jun. 1, 1999 (WO) .................................. PCT/CA99/00504

(51) Int. Cl.⁷ ..................................................... F02M 27/00
(52) U.S. Cl. .............................................................. 123/538
(58) Field of Search ................................. 134/169 A, 20; 123/538, 198 A

(56) References Cited

U.S. PATENT DOCUMENTS

| | | | |
|---|---|---|---|
| 3,597,668 | * 8/1971 | Yoshimine | ............................. 317/262 |
| 4,850,188 | 7/1989 | Testone . | |
| 4,989,561 | * 2/1991 | Hein et al. | ............................. 123/198 |
| 5,097,806 | * 3/1992 | Vataru et al. | ..................... 123/198 A |
| 5,232,513 | 8/1993 | Suratt et al. . | |
| 5,271,369 | 12/1993 | Melendrez . | |

FOREIGN PATENT DOCUMENTS

| | | |
|---|---|---|
| 4028228A | * 3/1992 | (DE) . |
| WO 97/44581 | 11/1997 | (WO) . |
| WO 98/51924 | 11/1998 | (WO) . |

* cited by examiner

*Primary Examiner*—Willis R. Wolfe
*Assistant Examiner*—Katrina B. Harris
(74) *Attorney, Agent, or Firm*—Marvin S. Towsend

(57) ABSTRACT

A method and apparatus is presented for cleaning engines which includes processing a previously condensed process fuel and passing it through a vessel which is provided with electrodes that provide a negative electrical charge to the molecules of the liquid fuel. The electrically charged fuel is then connected through the fuel line to the engine to be cleaned, and the engine is operated for approximately half an hour utilizing the electrically charged fuel whereby carbon deposits and other contaminants are cleaned from the engine and the catalytic converter. The vessel has an inlet and an outlet port, a pressure regulator at the inlet port for permitting air under pressure to enter into the vessel to pressurize the liquid fuel and an outlet port for exhausting the charged fuel into the engine to be cleaned.

12 Claims, 9 Drawing Sheets

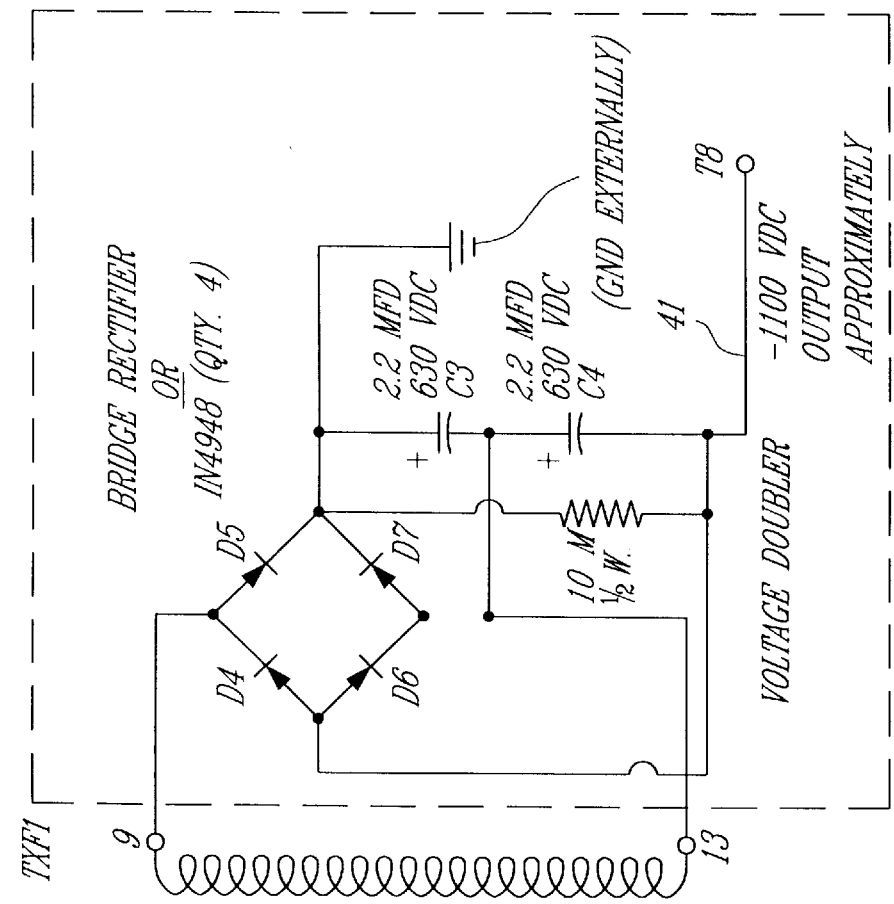
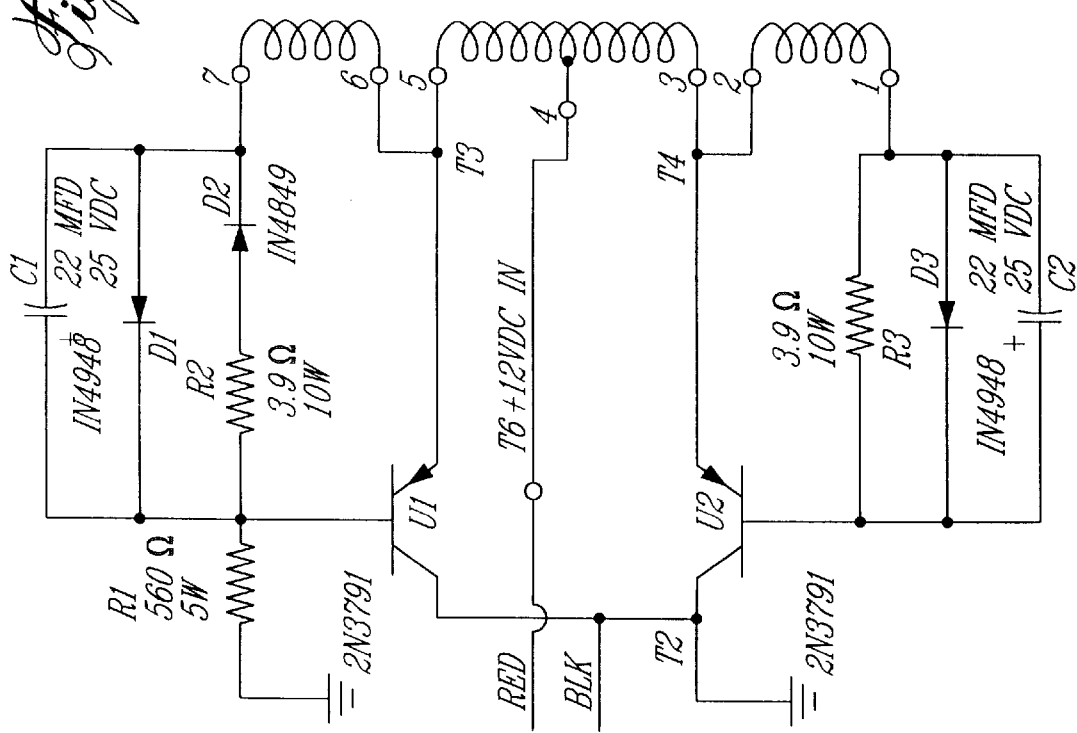
Fig. 4

CLEANER FOR COMBUSTION SYSTEMS AND CATALYTIC CONVERTERS

The present application claims the benefit of provisional application Ser. No. 60/105,995, filed Oct. 28, 1998.

BACKGROUND OF THE INVENTION

1. Field of the Invention

The present invention relates to a cleaner for combustion systems and catalytic converters, and more particularly, to a method and apparatus used for cleaning the combustion chambers and fuel and exhaust passages of an internal combustion engine.

2. Description of the Prior Art

It is known to clean internal combustion engines by flushing out the engine with a cleaning fluid or other type of chemical solvent solution. Typical of such systems is U.S. Pat. No. 5,097,806, issued Mar. 24, 1992 and assigned to Winn Oil Company for a "Multi-mode Engine Cleaning Fluid Application, Apparatus and Method". In the above-mentioned patent, a separate canister containing a liquid mixture of engine fuel and injector cleaning solvent is connected to the fuel line of an internal combustion engine, and the engine is operated using the fuel solvent mixture.

U.S. Pat. No. 5,381,810 issued Jan. 17, 1195 to Frederick Mosher. Columns 1 and 2 of this United States patent describe the background of the evolution of internal combustion engine cleaners and the problems of removing the buildup of carbon and other organic compounds on the internal engine surfaces.

As described in the Mosher patent, the mixture of fuel and solvent can also be problematic because the better the solvent, the more corrosive it can be which, of course, is detrimental to the internal surfaces of the engine. The solution proposed by Frederick Mosher is to more accurately control the pressure and pump speed to adjust the fuel cleaner solution pressure.

SUMMARY OF THE INVENTION

It is an aim of the present invention to provide a method and apparatus for readily cleaning an internal combustion engine of carbon deposits and other contaminants.

It is an aim of the present invention to provide a cleaning solution, which is a highly combustible fuel.

The method is dependent on the use of a fuel, which has been processed in accordance with the method described in co-pending International Application No. PCT/CA98/00367, filed Apr. 16, 1998, published Oct. 29, 1998 under Publication No. WO 98/47982, entitled "Fuel and Process for Fuel Production", which is incorporated herein by reference. Furthermore, a molecular reactor for producing the fuel is described in International Application No. PCT/CA98/00454, filed May 8, 1998 and published Nov. 19, 1998 under Publication No. WO 98/51924 and entitled "Molecular Reactor for Fuel Induction".

The process, in accordance with the above-mentioned published patent application WO98/47982, provides a highly combustible fuel vapor of negatively charged particles of fuel for use directly in the air/fuel manifold for an internal combustion engine. In the present invention, the vaporized fuel, which has been processed according to the above method, is allowed to condense and is distributed in a liquid form.

In accordance with the present invention, the condensed processed fuel is passed through a vessel provided with electrodes that provide a negative electrical charge to the molecules of the liquid fuel. The electrically charged fuel is then connected through the fuel line to the engine to be cleaned, and the engine is operated for approximately a half hour utilizing the electrically charged fuel, whereby the operation of the engine using the electrically charged fuel results in the cleaning of carbon deposits and other contaminants within the engine and the catalytic converter if such is connected to the exhaust.

An apparatus in accordance with the present invention includes a vessel for receiving a liquid fuel, at least an electrode protruding within the vessel, wherein the electrode has a negative polarity and the walls of the vessel or ground have a positive polarity, the vessel having an inlet and an outlet port, a pressure regulator at the inlet port for permitting air under pressure to enter into the vessel to pressurize the liquid fuel, and an outlet port for exhausting the charged fuel into the engine to be cleaned.

BRIEF DESCRIPTION OF THE DRAWINGS

Having thus generally described the nature of the invention, reference will now be made to the accompanying drawings, showing by way of illustration, a preferred embodiment thereof, and in which:

FIG. 4 is a diagram showing the power supply;

DESCRIPTION OF THE PREFERRED EMBODIMENTS

Figure 1:
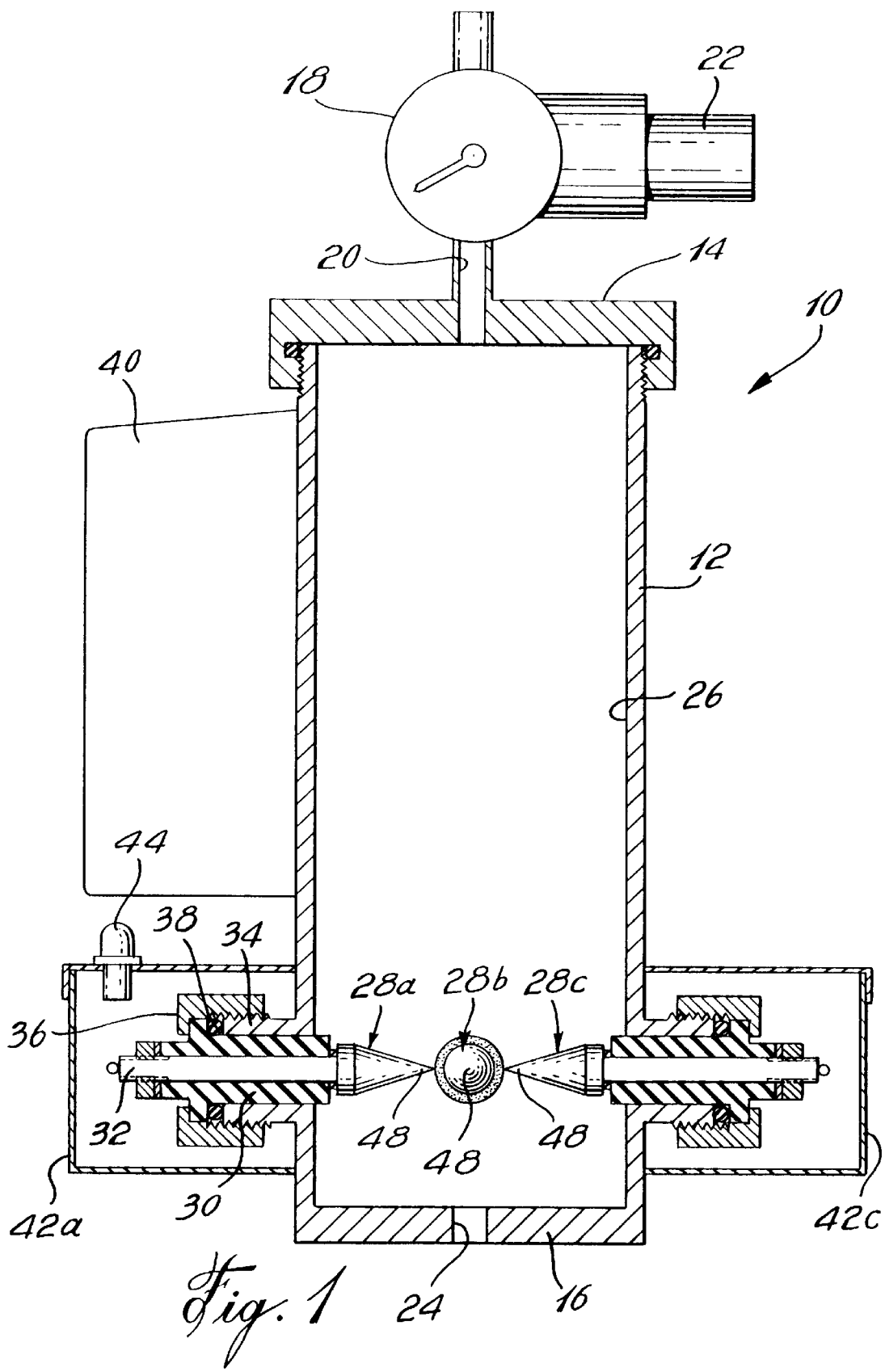
FIG. 1 is a vertical cross section of the reactor vessel and accessory apparatus in accordance with an embodiment of the present invention.
Figure 2:
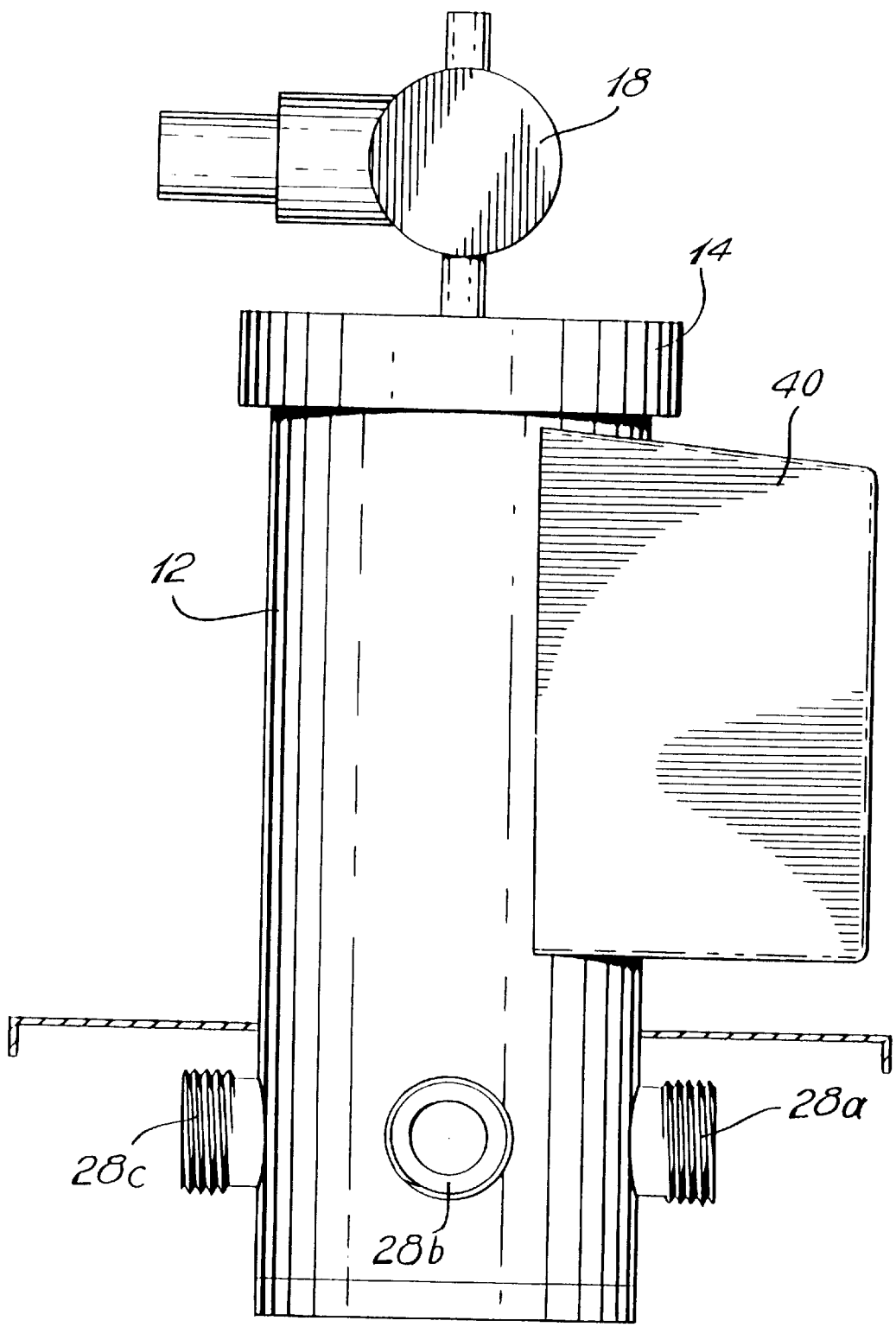
FIG. 2 is a side elevation of the apparatus in accordance with FIG. 1.
Figure 3:
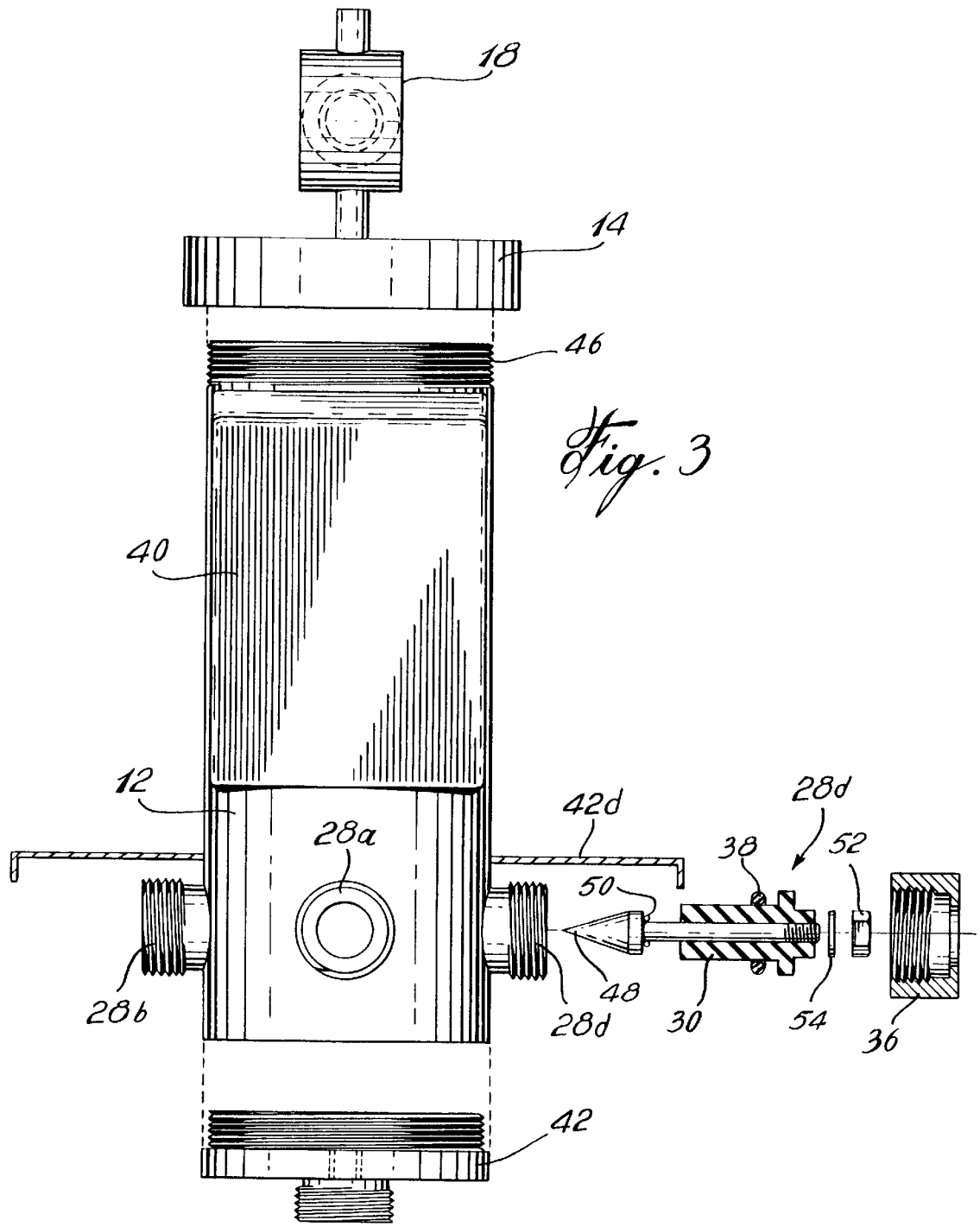
FIG. 3 is an exploded view of the apparatus in accordance with FIG. 1 and in particular showing one of the electrodes in an exploded view.

Referring now to the drawings and in particular FIGS. 1 to 3, there is shown a treatment apparatus 10 having a tubular cylindrical vessel wall 12 with a threaded cap 14 and a bottom wall 16. A pressure regulator 18 is mounted to the cap 14, and an air passage 20 extends from the pressure regulator 18 to the chamber 26 defined by the wall 12. The pressure regulator can be connected to an air pressure conduit by means of the nipple 22.

An opening 24 represents the outlet port in the wall 16. The vessel 12, cap 14, and wall 16 define the chamber 26.

In the present embodiment, four identical electrodes 28a to 28d are provided, extending laterally into the chamber 26. Each electrode, as represented by electrode 28a, includes an insulation sleeve 30 and a conductor stem 32. . In the exploded view of FIG. 3, the electrode is shown in more detail. The electrode 28a is fitted into a collar 34. The electrode 28a is also provided with a threaded sleeve 36 and an O-ring seal 38 for sealing the electrical insulator and electrode within the vessel 12. The insulator sleeve may be of Teflon. Each electrode 28a to 28d includes a sharpened cone tip 48 Electrode 28d further includes an O-ring 50 which is placed between the tip 48 and the Teflon insulation sleeve 30. A lock nut 52 and washer 54 complete the assembly of the electrode assembly 28d.

The electrode assembly 28a may be contained within a jacket 42a to which is mounted an indicator light 44 as will be described. Similarly, electrodes 28b, 28c, and 28d would be housed in jackets 40b (not shown), 40c, and 40d.

A power supply 40 is schematically represented in detail in reference to FIG. 4. The power supply 40 is connected to the lead 41 to the electrodes shown in FIG. 5. The power supply 40, as shown in FIG. 4, is designed to generate −900 volts and up to −1100 volts dc.

Figure 5:
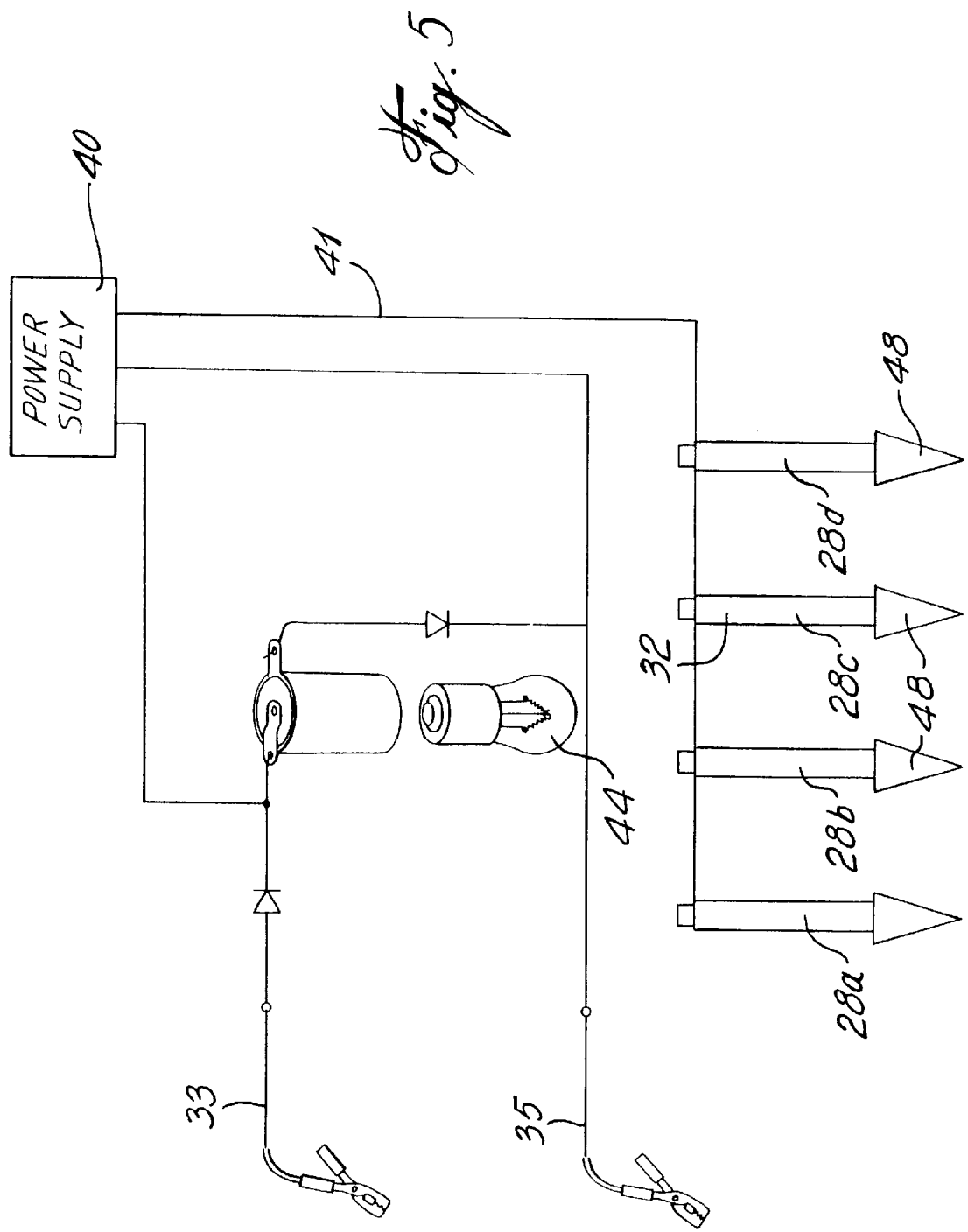
FIG. 5 is a schematic diagram of the wiring for the apparatus.

FIG. 5 illustrates a typical wiring circuit for the electrodes 28a–28d extending from the power supply 40. The leads 33 and 35 connect a power source through three-pin connector 39 to the power supply module 40.

Figure 6:
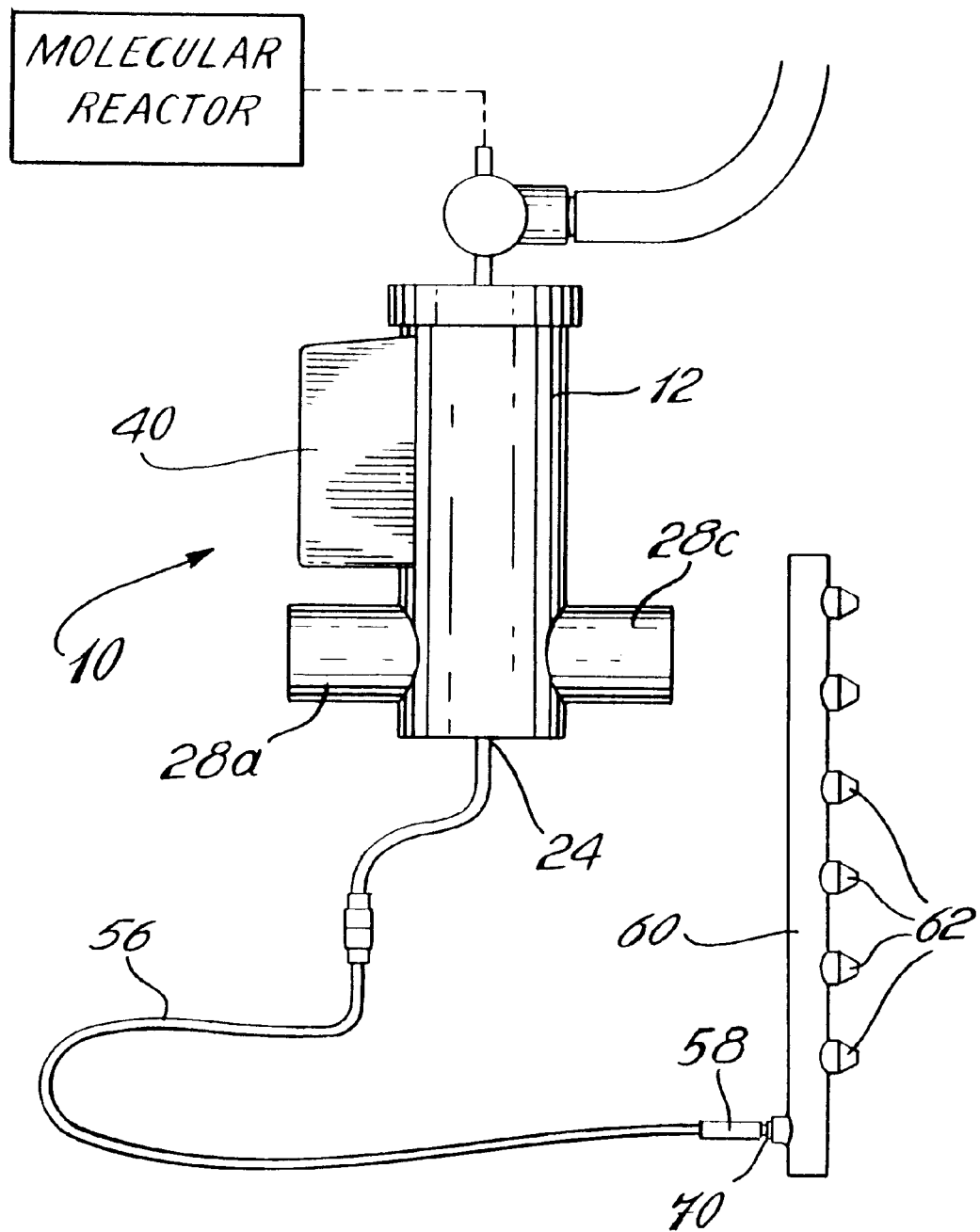
FIG. 6 is a schematic view of the process of the present invention.

FIG. 6 represents the steps of the process of the present invention. MR represents the molecular reactor in accordance with pending International Published Application No. WO98/51924, which is incorporated herein by reference, for producing the fuel by the process as described in International Published Application No. WO98/47982. The liquid fuel resulting from the treatment in the molecular reactor MR may be transported and distributed in I liter canisters to auto shops or other retail outlets where the customer would bring his automobile or vehicle for engine cleaning treatment.

The fuel charging assembly 10, which includes the vessel 12, the power supply 40, and the electrodes 28a to 28d, would be found as a unit on location at the auto shop. A flexible conduit 56 extends from the outlet port 24 and includes a quick disconnect fuel coupling 58 at the end of the flexible conduit 56.

The lid 14 is removed from the vessel 12 when it is required to charge the vessel with a liter of the treated fuel. The content of a canister of treated liquid fuel is poured into the chamber 26 and the cover 14 is sealed to the vessel 12 by threads 46. The apparatus is activated and a charge of negative voltage is induced to the treated fuel in the chamber 26 by means of the electrodes 28a–28d. A pressurized air hose is connected to the pressure regulator 18 by means of nipple 22. The pressure of air into the vessel 12 can be manually or automatically regulated in order to provide a constant pressure to the fuel entering into the engine.

An injector rail 60 with injectors 62 is shown in FIG. 6. The fuel line, to the injector rail 60, of a typical gas internal combustion engine is disconnected, and the line 56, including the quick disconnect coupler 58, is connected to the injector rail 60 by means of nipple 70. Thus, the treated fuel from the vessel 12 will be substituted for the regular fuel into the engine.

The engine is then started and runs on the electrically charged fuel from the vessel 12 for approximately half an hour. In a typical treatment the exhaust pipe appeared to be clean, and water deposit with black solids was discovered on the floor below the exhaust pipe.

Figure 7:
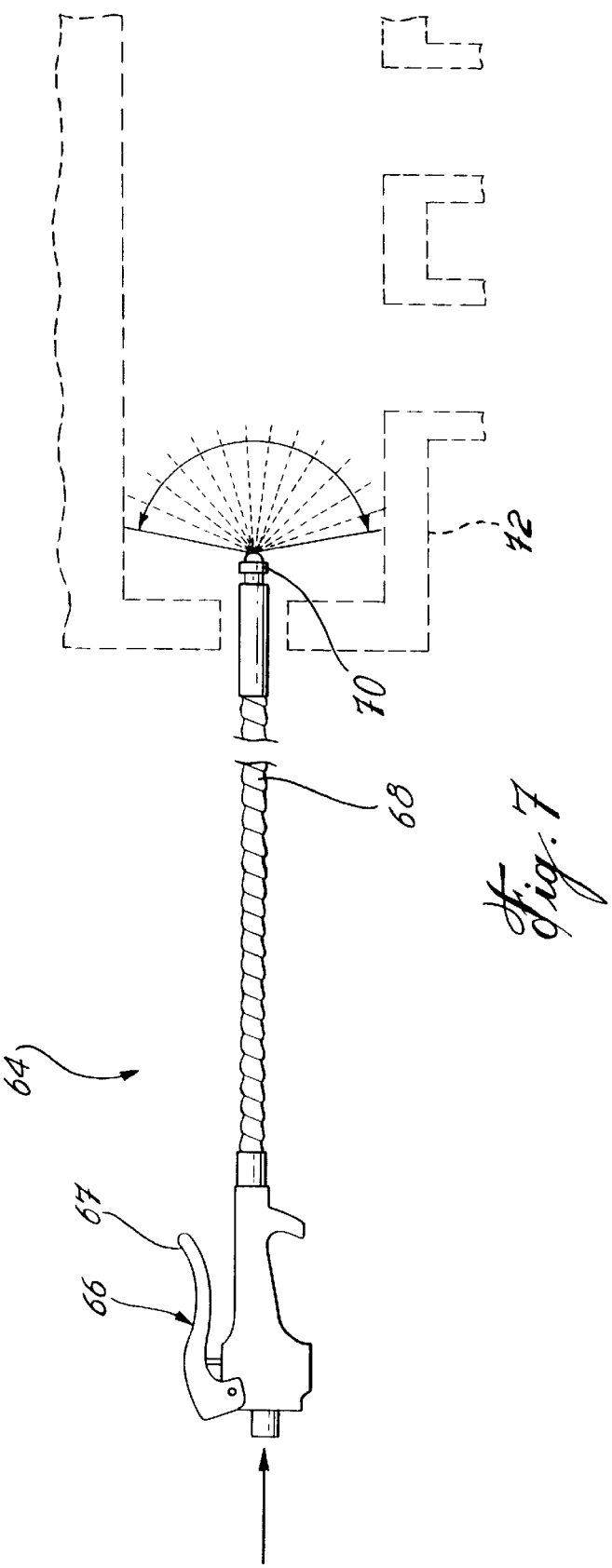
FIG. 7 is a side elevation of an embodiment of a blowgun to be used with the apparatus.

FIG. 7 shows an embodiment of a blowgun 64 that could be utilized with the present invention for injecting the electrically charged fuel from the chamber 26 into a manifold 72 in an engine. The blowgun includes a pistol grip 66 with a valve control 67. A flexible metal hose 68 extends from the blow gun pistol grip 66 and is provided with a spray nozzle 70. In the present embodiment, the spray nozzle provided a spray cone of 160°. The blowgun is especially used for the injector rail and/or the manifold of a typical internal combustion engine.

Figure 8:
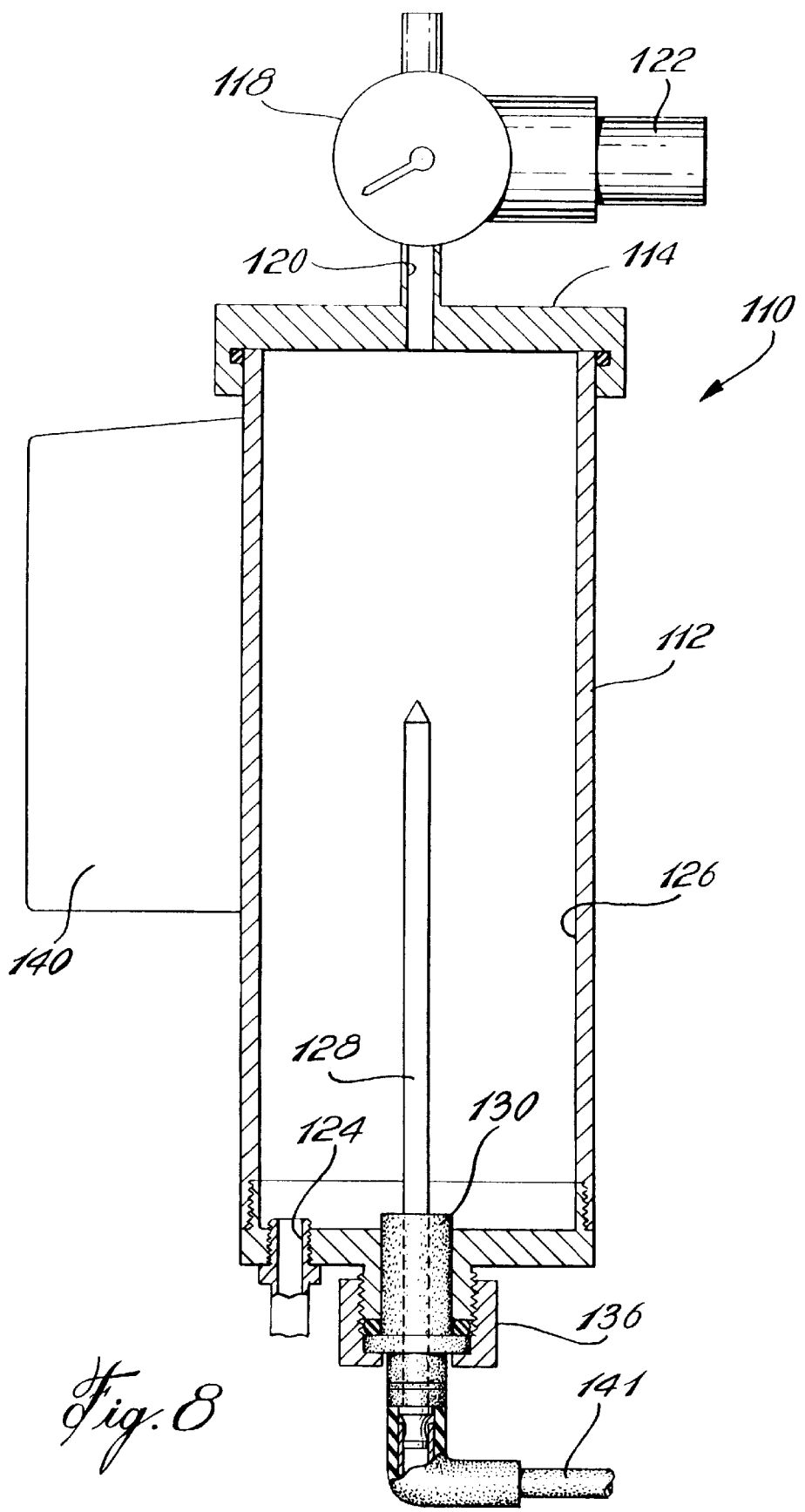
FIG. 8 is a vertical cross section of another embodiment of the vessel and apparatus compared to FIG. 1.
Figure 9:
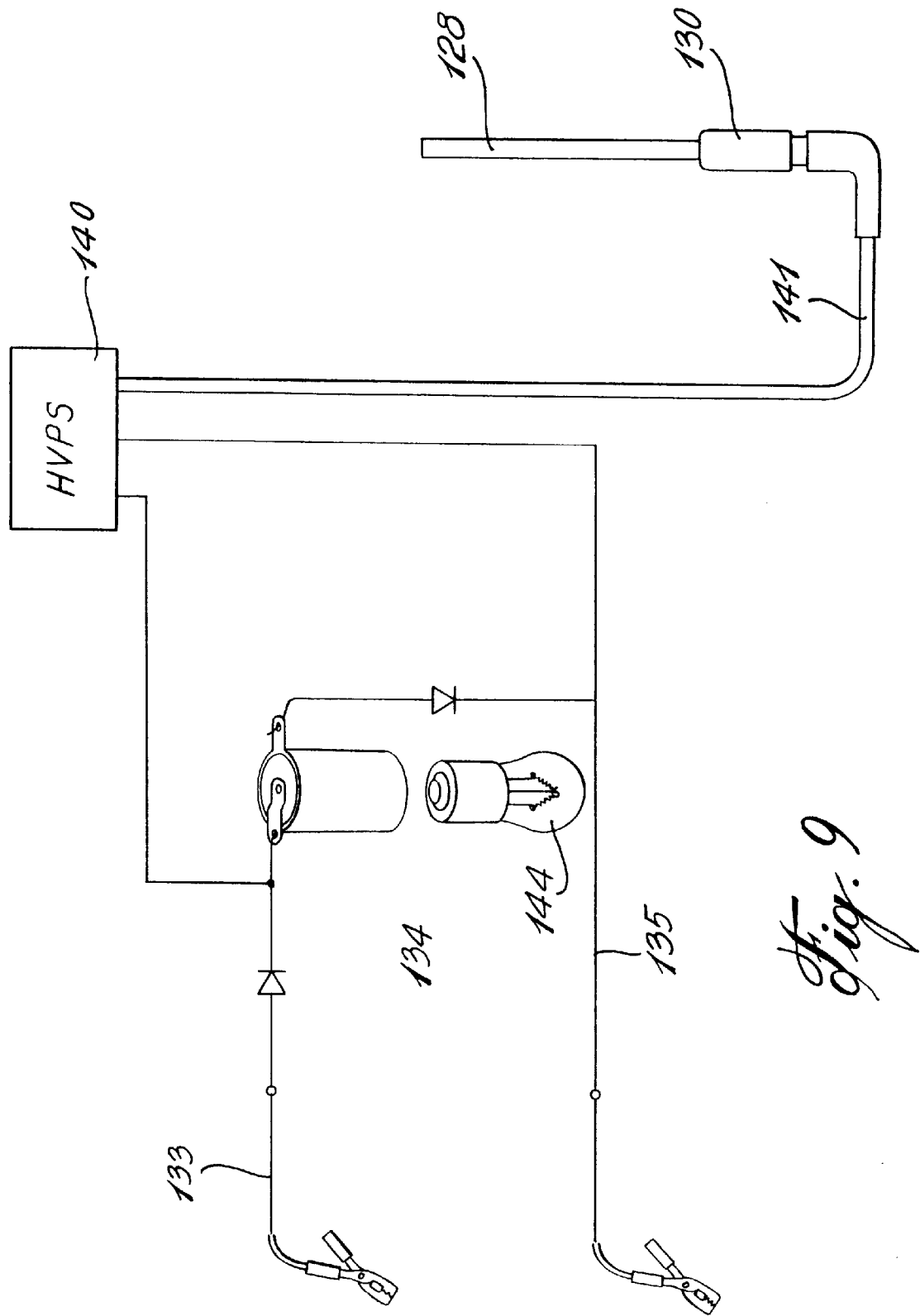
FIG. 9 is a schematic wiring diagram of the embodiment shown in FIG. 8 and compared to FIG. 5.

The embodiment shown in FIGS. 8 and 9 include reference numerals that have been raised by 100.

The embodiment shown in FIG. 8 is characterized by a single electrode 128 inserted through the bottom wall into the chamber 126. The lead 141 coming from the power supply 140 is connected to the base of the electrode that is insulated from the vessel 12 by means of an insulator sleeve 130.

We claim:

1. A kit for cleaning an internal combustion engine comprising a fuel treatment vessel including at least an electrode, a power supply for providing a electrical potential differential to the electrode, means for filling the vessel with an electrically charged highly combustible liquid fuel, means for providing a pressurized gas into the vessel, an outlet port for discharging the treated combustible fuel, and a conduit to be substituted for a gas line on an engine to be cleaned, means for charging the combustible treated liquid fuel with said electrical potential and means for feeding the combustible treated fuel to an internal combustion engine while the engine is running.

2. The kit as defined in claim 1 wherein the kit is a stand-alone unit.

3. The kit as defined in claim 1 wherein there is a single electrode extending within a chamber defined by the vessel.

4. The kit as defined in claim 1 wherein there are four electrodes protruding into the chamber defined by the vessel and the electrodes are in close proximity to each other.

5. The kit as defined in claim 4 wherein the electrodes are identical and each have a sharp conical tip.

6. The kit as defined in claim 1 wherein the negative electrical potential on the electrode is −900 volts.

7. The kit as defined in claim 1 wherein a flexible hollow wand is provided with a nozzle having a wide-angle spray and adapted to be connected to said conduit and to be inserted into the engine gas rail.

8. The kit as defined in claim 7 wherein the wide angle is 160 degrees.

9. A method of cleaning an internal combustion engine comprising utilizing a previously electrically charged highly combustible fuel, feeding a batch of the fuel in liquid state into a treatment vessel defining a treatment chamber, providing a further electrical potential within the chamber to charge the molecules of the liquid fuel, communicating the treated liquid fuel to the injectors of an internal combustion engine, and operating the engine with the electrically charged fuel in order to remove carbon deposits and other contaminants from the engine.

10. The method as defined in claim 9 wherein the engine is operated for 30 minutes and the batch of fuel is one liter.

11. The kit as claimed in claim 1, wherein the electrode is provided with a negative polarity.

12. The method as defined in claim 9, wherein the fuel has a previous negative electrical charge and is treated with a further negative electrical charge.

\* \* \* \* \*